United States Patent [19]

Hook, Jr.

[11] Patent Number: 4,948,264
[45] Date of Patent: Aug. 14, 1990

[54] APPARATUS FOR INDIRECTLY DETERMINING THE TEMPERATURE OF A FLUID

[76] Inventor: Richard B. Hook, Jr., 10 Hollywood Dr., Burnt Hills, N.Y. 12027

[21] Appl. No.: 882,564

[22] Filed: Jul. 7, 1986

[51] Int. Cl.$^5$ .......................... G01K 1/16; G01K 7/02
[52] U.S. Cl. ..................................... 374/144; 374/138
[58] Field of Search ............... 374/138, 144, 147, 148, 374/208; 415/118

[56] References Cited

U.S. PATENT DOCUMENTS

| 1,615,503 | 1/1927 | Brown | 374/179 |
|---|---|---|---|
| 1,675,210 | 6/1928 | Campbell et al. | 374/179 |
| 2,625,573 | 1/1953 | Connell | 374/138 |
| 2,648,983 | 8/1953 | Lamb | 374/144 |
| 2,849,518 | 8/1958 | MacDonald | 374/179 |
| 2,971,997 | 2/1961 | Carrico | 374/138 |
| 3,062,050 | 11/1962 | Bishop | 374/144 |
| 3,595,025 | 7/1971 | Stockel et al. | 165/169 |
| 3,788,143 | 1/1974 | Gabriel | 374/144 |
| 3,935,032 | 1/1976 | Brandeberry | 374/179 |
| 4,047,379 | 9/1977 | Brookes et al. | 374/144 |
| 4,196,772 | 4/1980 | Adamski et al. | 165/169 |
| 4,279,153 | 7/1981 | Kervistin et al. | 374/138 |
| 4,426,161 | 1/1984 | Gabriel et al. | 374/138 |
| 4,439,041 | 3/1984 | Schaeffer et al. | 165/169 |
| 4,480,930 | 11/1984 | DeZubay et al. | 374/144 |
| 4,552,724 | 11/1985 | Matsumoto et al. | 165/169 |

FOREIGN PATENT DOCUMENTS

| 1147931 | 3/1985 | U.S.S.R. | 374/138 |
|---|---|---|---|
| 1139240 | 9/1985 | U.S.S.R. | 374/138 |
| 1006555 | 10/1985 | United Kingdom | 374/138 |

Primary Examiner—Thomas B. Will
Attorney, Agent, or Firm—Robert C. Lampe, Jr.

[57] ABSTRACT

A technique for indirectly determining the temperature of a fluid includes directing at least a portion of the fluid around the outside of a thermally conductive body so as to produce a substantially uniform temperature therein. The fluid temperature is then determined by measuring the resulting temperature within the body. In one embodiment, the fluid is directed around the body by enclosing the body in a shell which has an inlet opening, an outlet opening, and at least one passageway connecting the inlet opening to the outlet opening. In an embodiment which is particularly useful for gas turbine applications, the body is located inside of the outer casing of the turbine and is connected to a guide tube which extends through the outer casing in such a manner that the means employed for measuring the temperature within the body is insertable into and removable from the body through the guide tube. For gas turbines having two or more turbine wheel stages, the inlet opening may be connected in flow communication with a wheelspace of a relatively forward one of the stages, and the outlet opening may be connected to a wheelspace of a stage located downstream of the forward stage, so that the pressure differential created between the stages during turbine operation causes at least a portion of the gas located in the forward wheelspace to pass into the inlet opening, through the connecting passageway, and out of the outlet opening.

1 Claim, 3 Drawing Sheets

PRIOR ART

Fig_3

APPARATUS FOR INDIRECTLY DETERMINING THE TEMPERATURE OF A FLUID

BACKGROUND OF THE INVENTION

This invention relates to indirectly determining the temperature of a fluid. More particularly, it relates to employing the convection heat available in the fluid to produce a substantially uniform temperature in a thermally conductive body and measuring the resultant temperature within the body. In one embodiment, the invention is especially useful for measuring temperatures in the wheelspace area of a gas turbine.

A number of techniques are currently available for directly measuring the temperature of a fluid, such as a gas. However, in some situations, it is either not possible to directly measure the fluid temperature or it is inconvenient to do so. The fluid for which the temperature is to be determined may be flowing at a rapid rate or in a turbulent fashion, and/or the fluid may be corrosive or otherwise damaging to equipment employed for directly measuring the subject temperatures. Furthermore, it may not be possible or convenient to gain access to the fluid in question in order to directly measure its temperature.

One situation in which these factors are important considerations is in determining temperatures within a hot gas turbine For such turbines, a rotatable turbine wheel is typically mounted concentrically in a stationary outer casing. The turbine wheel is usually comprised of a series of blade stages. For each stage, a plurality of airfoil blades are arranged in a row around the outer circumference of the wheel. In operation, a supply of hot gas is directed through passageways in the turbine in such a manner that the gas flows against the turbine blades. The force produced by the gas flow being impinged on the turbine blades causes the turbine wheel to rotate. In this manner, the energy in the gas is converted to rotational movement of the turbine wheel. Besides producing rotational movement of the turbine wheel, this hot gas flow through the turbine also heats a number of the turbine components to elevated temperatures. In some turbine applications, the temperature of components exposed to the hot gas flow can reach levels which exceed their specified temperature capabilities. For those turbines a cooling fluid such as air is often utilized to maintain the temperatures of the exposed components below an acceptable maximum level.

In conventional heavy duty gas turbines, one of the components that is susceptible to overheating caused by hot gas flowing through the turbine is the area of the turbine wheel where airfoil blades are joined to the rotor disc assembly. In order to ensure that this and other areas of the turbine wheel are not subjected to excessively high temperatures during operation of the turbine, the temperature of gas located in an area of the turbine known as a wheelspace is determined and monitored. However, the gas located in this wheelspace area is not easily accessible for direct temperature measurement, and conventional techniques employed for determining this temperature often produce inaccurate results. Furthermore, the temperature sensing means employed is itself susceptible to failure, and is not easily replacable in the designs utilized by prior art wheelspace temperature measuring systems.

Accordingly, it is an object of the present invention to provide a system for indirectly determining the temperature of a fluid in such a manner that the fluid may be isolated from the temperature measuring means employed.

It is also an object of the present invention to provide a temperature determining apparatus for which the accuracy of the results produced is substantially independent of the particular positioning of the temperature sensing means employed, with respect to adjacent portions of the apparatus.

It is a further object of the present invention to provide a system which is especially useful for determining the temperature of gas located in the wheelspace area of a conventional gas turbine.

It is still another object of the present invention to provide an apparatus wherein the temperature sensing means employed is easily replacable.

SUMMARY OF THE INVENTION

In accordance with the present invention, an apparatus for determining the temperature of a fluid comprises a thermally conductive body and means for directing at least a portion of the subject fluid around the outside of the body, so as to produce a substantially uniform temperature therein. The apparatus also includes means for measuring the resulting temperature within the body. In one embodiment, the thermally conductive body has a cavity defined therein, and a thermocouple is disposed in the cavity for measuring the temperature within the body. The means employed for directing the fluid around the body conveniently comprises a shell disposed around the body, which shell is configured to have an inlet opening, an outlet opening, and at least one passageway connecting the inlet opening in flow communication with the outlet opening. In an embodiment which is particularly useful for gas turbine applications, the thermally conductive body is located inside the turbine's outer casing, and the apparatus of the present invention further comprises a guide tube extending through that casing. This guide tube is connected to the cavity defined in the body so that the means employed for measuring the temperature within the cavity is insertable into and removable from the cavity through the guide tube.

In the present invention, the temperature of a fluid is determined by directing at least a portion of the subject fluid around the outside of a thermally conductive body so that the heat energy in the fluid is transferred to, and produces a substantially uniform temperature in, the conductive body. The resulting temperature within the body is measured and correlated to the temperature of the fluid. In one embodiment, the fluid is directed around the body by providing a shell disposed around the outside of the body so as to enclose a substantial portion thereof. The shell is configured so as to have an inlet opening, an outlet opening, and at least one passageway connecting the inlet opening to the outlet opening. The fluid for which the temperature is to be determined is passed into the inlet opening, through the connecting passageway, and out of the outlet opening. When the present invention is employed to determine the temperature of gas located in the wheelspace area of the type of gas turbine which has two or more stages of airfoil blades attached to a rotatable turbine wheel, the inlet opening is preferably connected in flow communication with a wheelspace of a relatively forward one of the turbine wheel stages, and the outlet opening is connected in flow communication with a wheelspace of a stage located downstream of that forward stage. In such an embodiment, the pressure differential created between the stages during operation of the turbine causes at least a portion of the gas located in the forward wheelspace to pass into the inlet opening, through the connecting passageway, and out of the outlet opening.

BRIEF DESCRIPTION OF THE DRAWINGS

The subject matter which is regarded as the invention is particularly pointed out and distinctly claimed in the concluding portion of the specification. The invention itself, however, both as to its organization and its method of practice, together with further objects and advantages thereof, may best be understood by reference to the following description taken in conjunction with the accompanying drawings, in which:

DETAILED DESCRIPTION OF THE PREFERRED EMBODIMENTS

Figure 1:
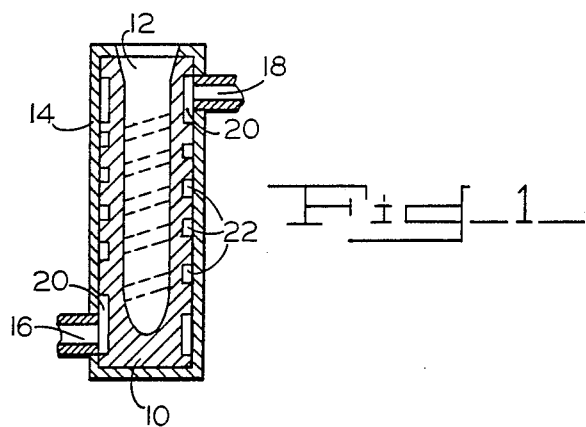
FIG. 1 is a side elevation, cross-sectional view schematically illustrating one embodiment of an apparatus for determining the temperature of a fluid, in accordance with the present invention.

FIG. 1 schematically illustrates one embodiment of an apparatus for indirectly determining the temperature of a fluid, in accordance with the present invention. The apparatus comprises thermally conductive body 10 and means (not shown in FIG. 1) for measuring the temperature within body 10. In the embodiment shown in FIG. 1, cavity 12 is defined in thermally conductive body 10, and the means utilized for measuring the temperature within body 10 comprises means for measuring the temperature within cavity 12. In this embodiment, the means employed for measuring the temperature within cavity 12 may conveniently comprise a thermocouple disposed in cavity 12.

The apparatus of the present invention also comprises means for directing at least a portion of the fluid for which the temperature is to be determined around the outside of body 10, so as to produce a substantially uniform temperature therein. In the embodiment illustrated in FIG. 1, the fluid directing means comprises shell 14 disposed around the outside of body 10 so as to enclose a substantial portion thereof. Shell 14 has defined therein inlet opening 16 and outlet opening 18. Shell 14 is further disposed with respect to body 10 so that at least one passageway connecting inlet opening 16 in flow communication with outlet opening 18 is formed between the inner surface of shell 14 and the outer surface of body 10. The fluid directing means also includes means (not shown in FIG. 1) for passing at least a portion of the fluid for which the temperature is to be determined into inlet opening 16, through the passageway connecting inlet opening 16 to outlet opening 18, and out of outlet opening 18. This fluid flow may be produced by, for example, passing the fluid through a pump, or by providing an appropriate pressure differential between the inlet and outlet openings. In the particular embodiment shown in FIG. 1, body 10 and shell 14 are each generally cylindrically shaped, and inlet opening 16 and outlet opening 18 are oppositely located at the axial ends of cylindrically shaped shell 14. Shell 14 is further disposed with respect to body 10 so that a pair of annularly shaped manifold grooves 20 and at least one helically wound connecting groove 22 are each formed between the inner surface of shell 14 and the outer surface of body 10. Each connecting groove 22 is wound around the outer surface of body 10 so as to form the general shape of a helix, with the central axis of the helix being generally parallel to the central axis of cylindrically shaped body 10. Manifold grooves 20 are configured so that the central axis of each of them is also parallel to the central axis of body 10. In the embodiment shown, the central axes of both manifold grooves 20 and of the helix formed by connecting groove 22 are each coaxially located with respect to the central axis of body 10. Such an embodiment provides a symmetrical apparatus in which heat from a fluid flowing therethrough is substantially evenly distributed around the outside of cavity 12. Manifold grooves 20 are oppositely located at the axial ends of shell 14, and are further disposed so that one of the pair of grooves 20 is connected in flow communication with inlet opening 16 and the other of the pair is connected in flow communication with outlet opening 18. Each connecting groove 22 is further disposed so as to connect manifold grooves 20 in flow communication with each other. With manifold grooves 20 and each connecting groove 22 arranged in this manner, the fluid flowing therethrough is directed over a substantial portion of the outer surface of body 10, and the heat energy associated with the fluid is transferred to body 10. Although only one helically wrapped connecting groove 22 is shown in FIG. 1, a plurality of such grooves may be used in the inventive apparatus in order to improve the transfer of heat energy from the fluid to body 10.

Several other means for directing the fluid around body 10 may be employed as alternatives to the fluid directing means shown in FIG. 1. In one embodiment, the passageway connecting inlet opening 16 in flow communication with outlet opening 18 is formed between the inner surface of shell 14 and the outer surface of body 10 so as to define an annularly shaped channel disposed around the outer surface of body 10, with the channel extending from one axial end of shell 14 to the opposite axial end thereof. The annular channel is further disposed so that the central axis thereof is generally parallel to the central axis of body 10. In another embodiment, body 10 and shell 14 are each cylindrically shaped, and the connecting passageway is formed between the inner surface of shell 14 and the outer surface of body 10 so as to define at least one channel which is helically wrapped around the outer surface of body 10. This embodiment is similar to that shown in FIG. 1, with the elimination of manifold grooves 20. Each channel is wound around the outer surface of body 10 so as to form the general shape of a helix, with the central axis of the helix being generally parallel to the central axis of body 10. In yet another embodiment, shell 14 is disposed with respect to body 10 so that a pair of manifold grooves 20 are defined and configured in the same manner as illustrated in FIG. 1. However, rather than utilizing helically wrapped connecting grooves to connect manifold grooves 20, shell 14 and body 10 are configured so that at least one axial connecting groove is formed between the inner surface of shell 14 and the outer surface of body 10. Instead of being helically wound around cylindrically shaped body 10, each connecting groove extends in an axial direction with respect thereto, with the longitudinal axis of each connecting groove being generally parallel to the central axis of body 10. For all of the embodiments of the fluid directing means described above, the inlet openings, outlet openings, and connecting passageways should be of sufficiently large inner diameter to avoid plugging and clogging from foreign particles, such as dust particles, contained in the fluid stream flowing therethrough.

For optimum durability and performance of the apparatus of the present invention, body 10 and shell 14 should be formed from a material which is inert to the fluid involved in a particular application. Alternatively, the inner surface of shell 14 and the outer surface of body 10 may each be coated with a material which is inert to the fluid involved, as long as the coating applied to the outer surface of body 10 exhibits high thermal conductivity. Also, for some applications, it may be desirable to coat these and other surfaces of the apparatus, such as, for example, the surface of body 10 which defines cavity 12, with materials which enhance surface conduction and/or inhibit oxidation. Preferably, body 10 is formed from a material which has sufficiently high thermal conductivity that, for the particular application involved, the temperature within cavity 12 is substantially the same as the temperature of the fluid flowing around the outside of body 10. In one particularly useful embodiment, shell 14 comprises stainless steel and body 10 comprises metal.

The apparatus described hereinabove for determining the temperature of a fluid does not require direct access for the temperature measuring equipment to the fluid for which the temperature is to be determined. Instead, a portion of the fluid concerned is separated from its native location and directed through the temperature determining apparatus. In accordance with the present invention, the temperature of the fluid is determined by directing at least a portion thereof around the outside of a thermally conductive body so as to produce a substantially uniform temperature therein. The resulting temperature within the body is then measured and correlated to the temperature of the fluid in question. In one preferred embodiment, the thermally conductive body has a cavity defined therein and the temperature within the body is determined by measuring the temperature within the cavity, in the manner illustrated in FIG. 1 by body 10 and cavity 12. As also illustrated therein, the step of directing the fluid around body 10 may conveniently be carried out by providing shell 14 disposed around the outside of body 10 so as to enclose a substantial portion of body 10. Inlet opening 16 and outlet opening 18 are each defined in shell 14, for passing the fluid into and out of the temperature determining apparatus. The inner surface of shell 14 is placed in position with respect to the outer surface of body 10 so that at least one passageway is formed therebetween which connects inlet opening 16 in flow communication with outlet opening 18. A portion of the fluid for which the temperature is to be determined is then passed into inlet opening 16, through the connecting passageway, and out of outlet opening 18.

Since the present invention determines the temperature of a fluid in an indirect manner, the instant invention may be employed for determining temperatures in a variety of fluid driven prime mover machinery applications. Temperatures may be determined even for fluids which are flowing at a rapid rate or in a turbulent fashion. Because the present invention isolates the temperature measuring equipment from the fluid itself, the invention may be utilized to determine temperatures for fluids which would be highly corrosive or otherwise damaging to the temperature measuring equipment employed, if the fluid was placed in direct contact therewith. Additionally, in the present invention, a portion of the fluid involved may be directed through temperature determining equipment which is located in a separate position from the native location of the fluid concerned. Therefore, the instant invention may be employed even for applications where access to the native location of the fluid is very limited.

One particularly useful application for the present invention is determining the temperature of a gas located in the wheelspace area of a gas turbine. Accordingly, the discussion hereinbelow is directed to embodiments of the present invention which encompass that application. However, it should be understood that the invention, in its broader forms, is not limited to such an application.

Figure 2:
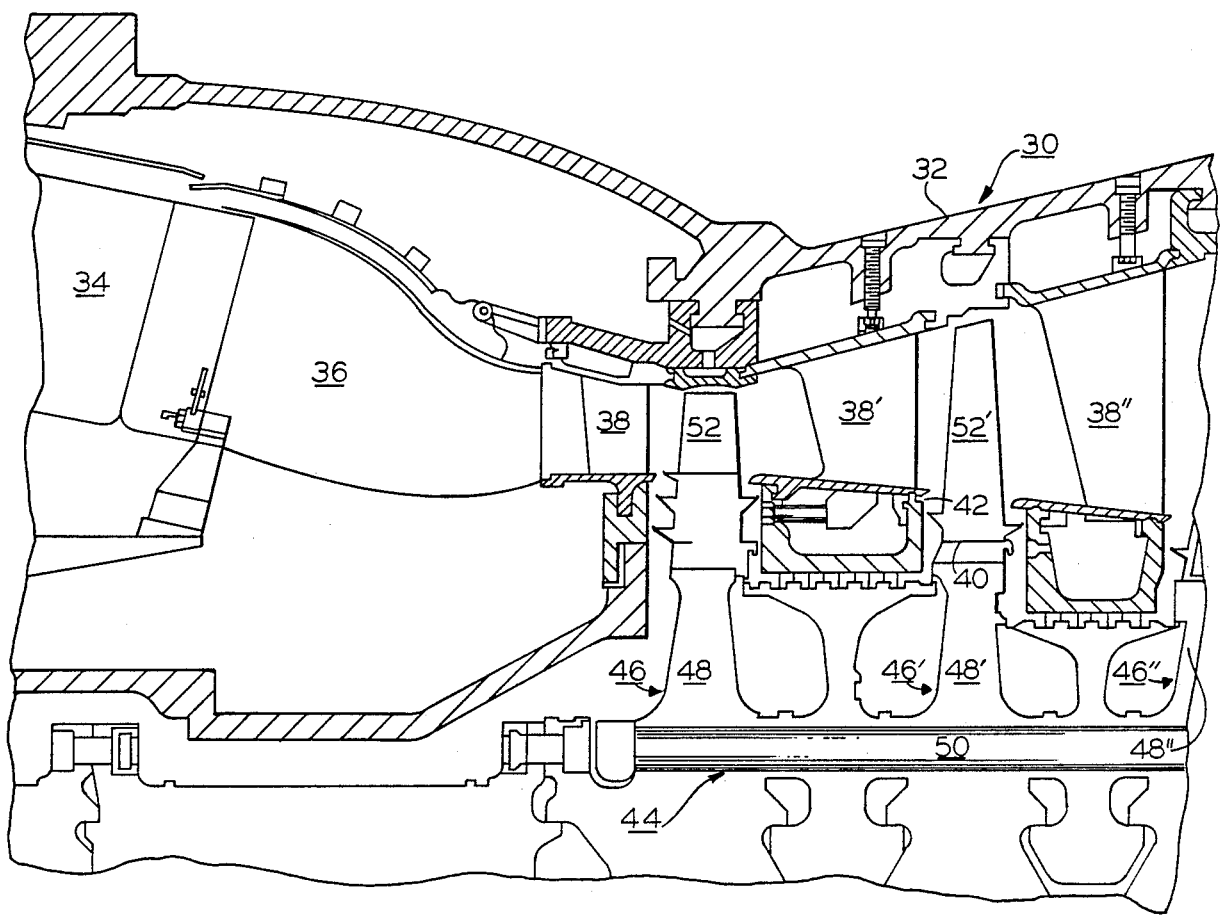
FIG. 2 is a side elevation, partial cross-sectional view schematically illustrating a conventional configuration for a hot gas turbine.

The relevant portions of a conventional gas turbine are schematically illustrated in FIG. 2. As shown therein, turbine 30 comprises rigid casing 32, which serves as a frame and support structure for the components of turbine 30 located internally of casing 32. Turbine 30 includes combustion chamber 34 in which a suitable air/fuel mixture is burned in order to produce a supply of hot gas for powering the turbine. Although only one combustion chamber 34 is shown in FIG. 2, typical gas turbines employ a plurality of such chambers. Mounted generally concentrically in casing 32 is turbine rotor assembly 44. Rotor assembly 44 is comprised of a plurality of turbine wheels 46, 46', and 46", which wheels are disposed in an axially spaced relationship along the central axis of turbine 30. Turbine wheels 46, 46', and 46" are, in turn, comprised of rotor discs 48, 48', and 48", respectively, mounted on rotor shaft 50. A plurality of airfoil blades 52, which are often referred to as "buckets", are mounted in a spaced-apart relationship in a peripheral row around the outer circumference of rotor disc 48. In a similar fashion, a plurality of airfoil blades are also mounted around the outer circumference of each of discs 48' and 48". Turbine 30 also includes transition passageway 36 which is configured so that gas flowing therethrough from combustion chamber 34 is directed against and between the airfoil blades attached to discs 48, 48', and 48". Combustion chamber 34 is located at what is referred to as the fore end of turbine 30, and turbine wheels 46, 46', and 46" are referred to as the first stage, second stage, and third stage turbine wheels, respectively. In operation, hot gas from combustion chamber 34 passes, in succession, between airfoil blades 52 of turbine wheel 46, blades 52' of turbine wheel 46', and similar airfoil blades (not shown in FIG. 2) of turbine wheel 46". The gas flowing through passageway 36 is impinged on the airfoil blades of each turbine wheel and causes rotational movement of turbine rotor assembly 44. In order to ensure that the gas flow is impinged on the airfoil blades in an optimum manner and direction, a plurality of guide vanes is disposed upstream of each turbine wheel stage, in the manner illustrated in FIG. 2 by guide vanes 38, 38', and 38".

The hot gas flowing through turbine 30 heats the turbine components exposed to the gas flow to elevated temperatures. In some turbine applications, a cooling fluid such as air is utilized to maintain the temperature of the exposed components at a level below the maximum temperature capability for those components. In conventional heavy duty gas turbines, one of the components that is susceptible to damage from overheating is the area of each turbine wheel where the airfoil blades are joined to the rotor disc, which area is designated in FIG. 2 by reference numeral 40. To ensure that this and other areas of the turbine wheel are not subjected to excessively high temperatures during turbine operation, the temperature of the space between the turbine wheel and adjacent turbine structures is measured and monitored. In the turbine arts, this area is known as a "wheelspace". It is illustrated in FIG. 2 by reference numeral 42.

Figure 3:
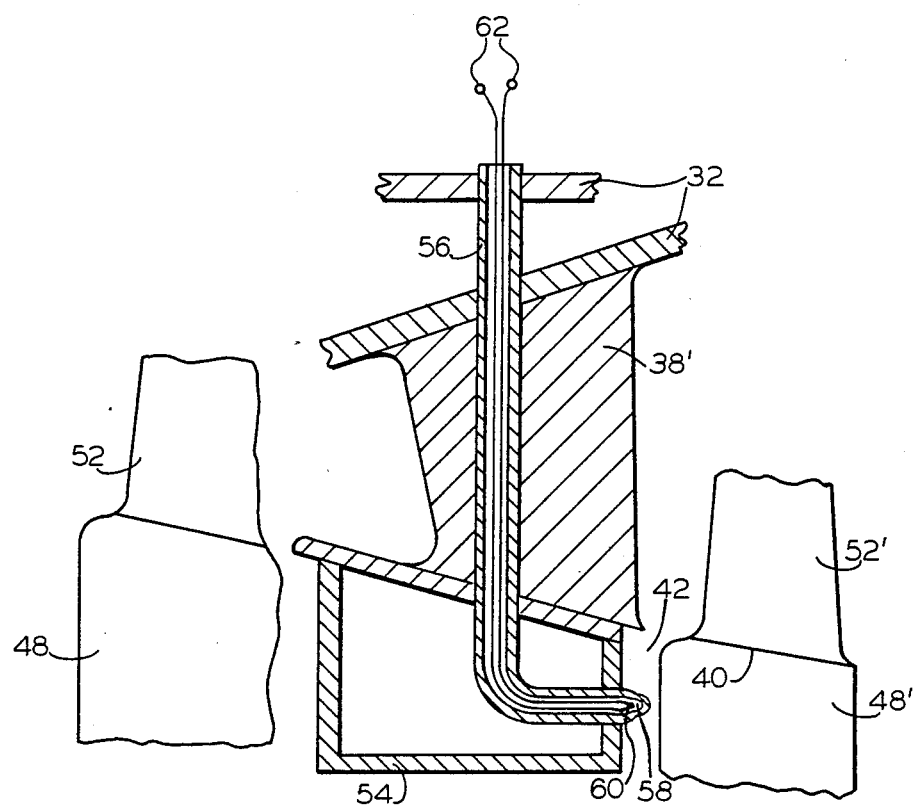
FIG. 3 is a schematic view similar to that of FIG. 2, illustrating a prior art apparatus for determining the temperature in a wheelspace area of the turbine.

FIG. 3 schematically illustrates one prior art technique for determining the wheelspace temperature during operation of a gas turbine. For the sake of clarity, only the relevant portions of the conventional turbine illustrated in FIG. 2 have been shown in FIG. 3. As is illustrated in FIG. 3, in the prior art technique for determining the wheelspace temperature, guide tube 56 is disposed through turbine casing 32 and configured so as to extend through a portion of diaphragm 54 into wheelspace area 42. The end of guide tube 56 which extends into wheelspace area 42 has attached thereto thermocouple well 58. Thermocouple 60 is disposed in thermocouple well 58 and is electrically connected to external temperature sensing means (not shown in FIG. 3) by means of thermocouple wires 62. In this prior art configuration, the accuracy of the temperature measurement obtained is somewhat dependent on the positioning of thermocouple 60 with respect to thermocouple well 58, due primarily to the limited access available to wheelspace area 42. Moreover, in many turbine applications, diaphragm 54 becomes heated during turbine operation, to a temperature which is considerably higher than the temperature of gas located in wheelspace 42. Typical temperatures for wheelspace area 42 are about 700° F. whereas the temperature of diaphragm 54 may exceed 1,000° F. Thus, heat from diaphragm 54 is conducted through guide tube 56 into thermocouple well 58, thereby resulting in errors in the wheelspace temperatures indicated by thermocouple 60. Additionally, during long-term operation of the turbine, thermocouple 60 may occasionally fail and need to be replaced. Such replacement is best accomplished by sliding thermocouple 60 and associated wires 62 out of guide tube 56 and replacing them with new components. However, in the prior art configuration, the bend in guide tube 56 makes it difficult to insert a new thermocouple into thermocouple well 58.

Figure 4:
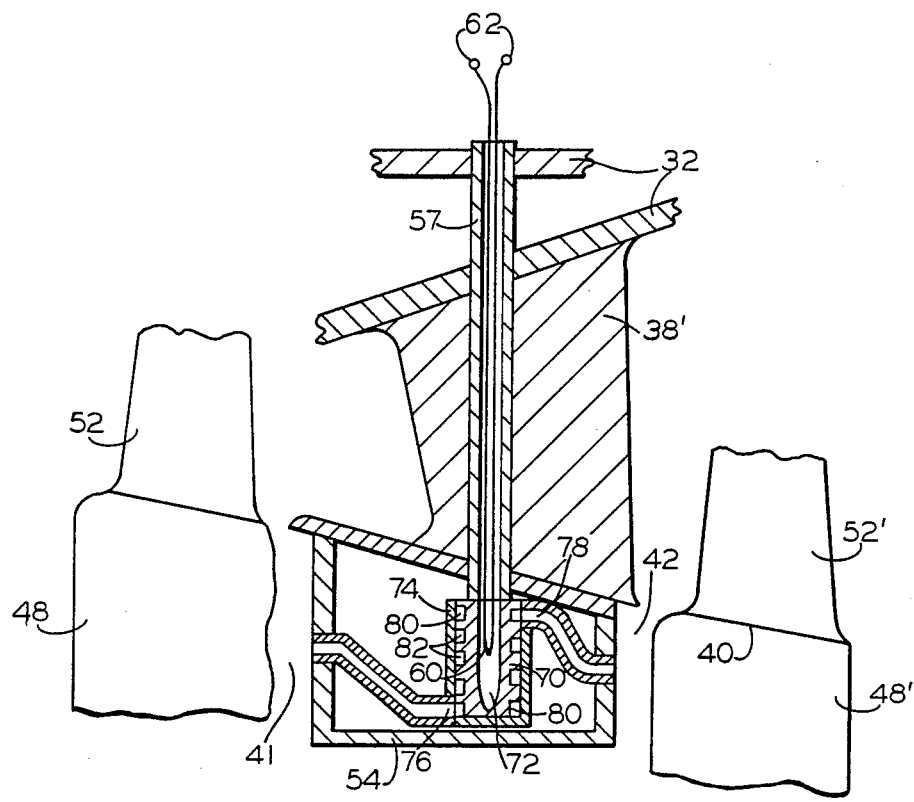
FIG. 4 is a view similar to that of FIG. 3, schematically illustrating one embodiment of an apparatus for determining the temperature of a gas located in the wheelspace area of a gas turbine, in accordance with the present invention.

FIG. 4 is a simplified schematic view illustrating one embodiment of a technique for indirectly determining the temperature of a gas located in the wheelspace area of a gas turbine, in accordance with the present invention. The temperature determining apparatus shown in FIG. 4 comprises thermally conductive body 70 and means for measuring the temperature within body 70. In the embodiment shown, body 70 has cavity 72 defined therein and the temperature of body 70 is measured by measuring the temperature within cavity 72. The means employed for measuring the temperature within cavity 72 may conveniently comprise a thermocouple disposed therein, in the manner illustrated in FIG. 4 by thermocouple 60. In the embodiment of FIG. 4, body 70 is located inboard of turbine casing 32, inside diaphragm 54. Body 70 is connected to guide tube 57, which extends through casing 32 and into diaphragm 54, so that the longitudinal axis of cavity 72 is aligned with the longitudinal axis of guide tube 57. With guide tube 57 and cavity 72 configured in this manner, the means employed for measuring the temperature within cavity 72 is insertable into and removable from cavity 72 through guide tube 57. Since it is not necessary for the guide tube of the present invention to have any bends or other changes in direction, insertion of such temperature measuring devices as thermocouples into the guide tube is much easier to accomplish than it is in the prior art configuration shown in FIG. 3. Furthermore, since the temperature is substantially uniform throughout cavity 72, the temperature reading obtained from thermocouple 60 is essentially independent of the positioning of thermocouple 60 within cavity 72. Additionally, with the temperature determining apparatus positioned as shown in FIG. 4, the temperature of diaphragm 54 has very little effect on the accuracy of the wheelspace temperature readings. In the present invention, a portion of the gas located in the wheelspace area is directed around the outside of body 70 so as to produce a substantially uniform temperature therein. With gas from the wheelspace area constantly flowing around the outside of highly thermally conductive body 70, the temperature within cavity 72 is substantially the same as the temperature of the gas flowing around body 70.

The means illustrated in FIG. 4 for directing the gas around body 70 comprises shell 74 disposed around the outside of body 70 so as to enclose a substantial portion thereof. Shell 74 has defined therein inlet opening 76 and outlet opening 78, for directing gas into and out of the temperature determining apparatus. The inner surface of shell 74 is placed in position with respect to the outer surface of body 70 so that at least one passageway is formed therebetween, which passageway connects inlet opening 76 in flow communication with outlet opening 78. For the type of gas directing means illustrated in FIG. 4, body 70 and shell 74 are each generally cylindrically shaped, and inlet opening 76 and outlet opening 78 are oppositely located at the axial ends of shell 74. The passageway connecting inlet opening 76 to outlet opening 78 is formed so as to define at least one groove which is helically wound around the outer surface of body 70. Each connecting groove 82 is wrapped around body 70 so as to form the general shape of a helix, with the central axis of the helix being generally parallel to the central axis of body 70. In the particular embodiment shown in FIG. 4, shell 74 is disposed with respect to body 70 so that a pair of annularly shaped manifold grooves 80 are also defined between the inner surface of shell 74 and the outer surface of body 70. Manifold grooves 80 are disposed so that the central axis of each of them is parallel to the central axis of body 70. Manifold grooves 80 are oppositely located at the axial ends of shell 74, and are further disposed so that one of them is connected in flow communication with inlet opening 76 and the other is connected in flow communication with outlet opening 78. Each connecting groove 82 is further disposed so as to connect manifold grooves 80 in flow communication with each other.

As discussed hereinabove in relation to FIG. 1, other gas directing means may be utilized in the present invention as an alternative to the means shown in FIG. 4. In one such embodiment, the connecting passageway is formed between the inner surface of shell 74 and the outer surface of body 70 so as to define an annularly shaped channel disposed around the outer surface of body 70, with the central axis of this annular channel being generally parallel to the central axis of body 70. In another embodiment, body 70 and shell 74 are each cylindrically shaped, and shell 74 is placed in position with respect to body 70 so that a pair of annularly shaped manifold grooves and at least one axial connecting groove are each defined between the inner surface of shell 74 and the outer surface of body 70. The pair of manifold grooves are oppositely located at the axial ends of shell 74 and are each disposed so that the central axis thereof is parallel to the central axis of cylindrically shaped body 70. They are further configured so that one of the grooves is connected in flow communication with inlet opening and the other is connected in flow communication with outlet opening 78, in the manner illustrated in FIG. 4. However, in this alternative embodiment, instead of each connecting groove being helically wrapped around body 70, it extends axially with respect thereto so that the longitudinal axis of each connecting groove is generally parallel to the central axis of body 70. Each connecting groove is further disposed so as to connect the manifold grooves in flow communication with each other.

In the present invention, a portion of the gas for which the temperature is to be determined is passed into inlet opening 76, through the connecting passageway, and out of outlet opening 78. For turbines having two or more turbine wheel stages, it is convenient to connect inlet opening 76 in flow communication with a wheelspace area of a forward one of the turbine wheel stages, and to connect outlet opening 78 in flow communication with a wheelspace area of a stage located downstream of that forward stage. As used herein, a "forward stage" means a stage located relatively near the fore end of the turbine, and a "downstream stage" means a stage located in the aft direction with respect to the forward stage. With the invention configured in this manner, the pressure differential created between successive turbine wheel stages during operation of the turbine causes at least a portion of the gas located in the relatively forward one of the wheelspace areas to pass into inlet opening 76, through the connecting passageway, and out of outlet opening 78. In the embodiment shown in FIG. 4, inlet opening 76 is connected to aft wheelspace area 41 of the relatively forward stage, and outlet opening 78 is connected to forward wheelspace area 42 of the stage located immediately downstream of that forward stage. Alternatively, any other location of lower static pressure, such as, for example, the interstage labyrinth seal or outside the turbine casing, may be used as an outlet connection in order to create the desired pressure differential for sampling the gas.

The foregoing describes a system for accurately determining the temperature of a fluid, without directly exposing the temperature sensing means employed to the fluid involved. The present invention provides a temperature determining technique for which the accuracy of the temperature readings obtained is not dependent on the particular positioning of the temperature sensing means with respect to adjacent portions of the temperature determining apparatus. The present invention is also readily adaptable for use in determining temperatures in the wheelspace area of conventional gas turbines. Furthermore, if the temperature sensing means employed in the instant invention fails during operation of the turbine, it is easily replacable.

While the invention has been described in detail herein in accord with certain preferred embodiments thereof, many modifications and changes therein may be effected by those skilled in the art. For example, while the thermally conductive body of the present invention has been shown in the Figures as comprising metal, other materials having high thermal conductivity and sufficient mechanical strength and resistance to corrosion for the particular application involved may also be used. Accordingly, it is intended by the appended claims to cover all such modifications and changes as fall within the true spirit and scope of the invention.

I claim:

1. In a prime mover of the type having an outer casing for containing a motive fluid; and, further with respect to the flow of motive fluid, having at least one row of stationary guide vanes disposed within the outer casing and at least one annular row of upstream rotating blades and at least one row of downstream rotating blades with the guide vanes disposed therebetween; an apparatus for measuring the temperature of the motive fluid on the upstream side of the stationary guide vanes comprising:

a shell having a fluid inlet and a fluid outlet;
a thermally conductive body disposed in the shell;
a passageway disposed between the shell and the thermally conductive body and connecting the fluid inlet with the fluid outlet;
a cavity formed within the thermally conductive body;
temperature measuring means disposed within the cavity in the thermally conductive body; and, wherein the stationary guide vanes include a radially inner annular diaphragm; the shell being disposed within the diaphragm and having the fluid inlet communicating with the upstream side of the annular diaphragm and the fluid outlet communicating with the downstream side of the annular diaphragm.

* * * * *